Jan. 28, 1964 F. WOMMELSDORF ETAL 3,119,311
PROCESS FOR THE MANUFACTURE OF A HARD PAPER RECEPTACLE
Filed Feb. 21, 1961 2 Sheets-Sheet 1

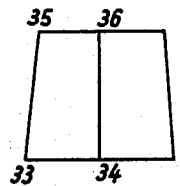
Fig. 12
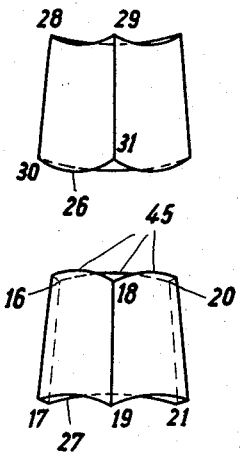
Fig. 13
Fig. 11
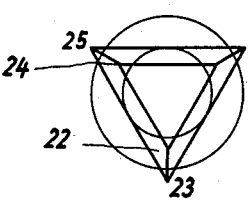
Fig. 10
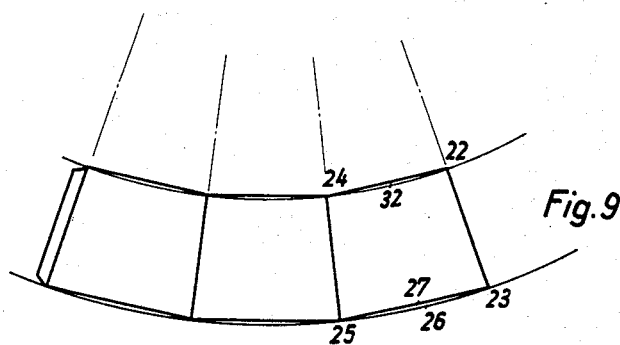
Fig. 9

United States Patent Office 3,119,311
Patented Jan. 28, 1964

3,119,311
PROCESS FOR THE MANUFACTURE OF A
HARD PAPER RECEPTACLE
Fritz Wommelsdorf, Hamburg-Altona, and Werner Schmidt, Hamburg, Germany, assignors to Maschinenfabrik Rissen G.m.b.H., a corporation of Germany
Filed Feb. 21, 1961, Ser. No. 90,860
Claims priority, application Germany Feb. 26, 1960
5 Claims. (Cl. 93—36.05)

The present invention relates to containers made of hard paper, which serve primarily for packing purposes. Particularly preferred are conical containers or receptacles, which are tapered in the direction of the bottom so that they can be telescoped into each other during transport in empty condition, and therefore, require relatively little space for their transport. Such beakers or cups are manufactured in general in the form of a truncated cone from two parts, i.e. a bottom part tent edgewise to upright position and a one-piece side wall which is cemented together. The bottom part and the side wall are flanged with each other and, if desired, cemented together. In addition, at the open end a bead is formed on the inside or the outside. Beakers of this conical two-piece type which—instead of a circular cross-section—have an angular e.g. quadratic cross-section, have also been produced. They have the advantage that upon being filled with goods to be transported, they require less space than containers having a circular cross-section. In order to facilitate their use by the housewife, such angular containers are often provided with rounded off portions at the corners. Such beakers or cups can be made also with a triangular, or elliptic or kidney-shaped cross-section. In this manner truncated pyramids having a predetermined base surface are obtained, such as shown in FIG. 1, i.e. a beaker having its opening in downward direction, a triangular cross-section and rounded-off corners.

Beakers or cups of the type described above, which are angular and conical hitherto have not been in use on a considerable scale. The reason was that the production of the necessary manufacturing tools was very difficult, particularly for automatic machines.

It is the main object of the present invention to simplify the production of such beakers or cups in such manner that the tools can be produced economically also for automatic machines.

The appended drawings diagrammatically illustrate some specific embodiments of and best modes for carrying out the invention, to which the invention is not limited.

In the drawings:

FIGURES 1 and 2 illustrate a triangular beaker, which is designed as a truncated pyramid, has an equilateral triangular bottom 1 having rounded off corners, and has a flanged edge 2 at its mouth or opening;

FIGURES 9 and 10 illustrate the development of the jacket and the top view of a truncated pyramid and a truncated cone, the bottoms of which have an equal linear periphery;

FIGURE 11 illustrates a truncated cone, the jacket of which is formed from the development of a truncated pyramid;

FIGURE 12 shows a truncated pyramid, the jacket of which is formed from the development of a truncated cone, the roundings of the limiting lines being somewhat exaggeratedly illustrated in FIGS. 11 and 12;

FIGURE 13 illustrates a truncated pyramid, the jacket of which is formed by development of a truncated pyramid;

Figure 3:
FIGURE 3 shows the bottom used for making the cup illustrated in FIGS. 1 and 2.
Figure 4:
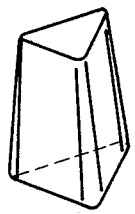
FIGURE 4 shows the lateral wall, FIGS. 3 and 4 being shown in parallel perspective view.

Referring now to the drawings in detail, a conical beaker or cup which is made of two parts and may have a circular or angular cross-section, can be automatically manufactured by various procedures. However, the lateral wall (FIG. 4) and the bottom (FIG. 3) are always made in separate working stages, whereafter the two parts are assembled and connected by flanging. For the lateral wall, on the automatic cup-manufacturing machine—or if desired in a separate machine—a section is punched out from a web of paper, said section corresponding to the development of the jacket. In the case of round cups, this is the development of a truncated cone shown in FIG. 8, and in the case of angular cups, this is, for example, the development of a truncated pyramid shown in FIG. 6. To the exact geometrical developments in both cases a flap is added, for cementing together the side or lateral walls. These flaps are shown in the case of a conical cup in FIG. 8 at 4, 5, 6, 7 and in the case of a cup of the truncated pyramid shape in FIG. 6 at 8, 9, 10, 11. This so-called lateral wall segment is coated with glue at the overlapping. The flap 4, 5, 6, 7 can be of sufficiently large size for winding around the entire jacket twice. Such cups with double winding are then, in general, coated on the entire length with glue so that the intermediate layer has an insulating effect between the two jacket surfaces. However, in connection with the considerations of the present case, it is irrelevant whether the simple or double winding is used. For the purpose of shaping the final lateral wall, the segment provided with glue is now wound on a mandrel, or—in other machines—cemented together in a cup, the shape of which corresponds to the final shape. It is, of course, essential that these cups are of very uniform shape so that they can be actually well telescoped into each other. In view of this uniformity, the step of forming the lateral wall is particularly important and the lateral wall must be dimensioned very exactly. In a separate working step the bottom (FIG. 3) is first punched out from a disc and is then passed through a bushing so that the edges will be in upright position. Subsequently, in most cases on mandrels, but in some cases also in suitable hollow tools the bottom and the side wall are assembled and connected by flanging. In order to carry out these operations automatically one after the other, so-called rotating-table presses are used, in which each lateral wall is taken up by equal tools, of which several are present and these tools are switched-on subsequently from station to station, where the individual working steps are carried out. It is clear, that in such operations carried out one after the other, the individual tools must be very exactly equal to each other, because otherwise there will be differences in the design and dimensions of the cups. In the manufacture of circular or conical tools this requirement of uniformity calls for highest precision of the manufacturing process, but the attaining of the required uniformity is still more difficult in the case of angular tools and can be attained only by the use of extremely expensive manufacturing tools and measuring gauges pertaining to the tools.

It has now been found that these difficulties can be avoided by proceeding according to the present invention as follows.

In carrying out this invention, in the manufacturing process the side or lateral wall for angular beakers or cups is first formed with a circular cross-section, i.e. as a truncated cone, and to bring about the angular design by putting the circular side wall onto an angular mandrel, on which the angularly punched out and drawn bottom part of the cup, is already placed. Thus, only the assembling tools need be angular in this process, while the particularly important tools for forming and dimensioning an angular side wall, which must be of particularly high precision and dimensions for said forming and dimensioning, can be substituted by circular tools which can be made simply by turning.

Figure 5:
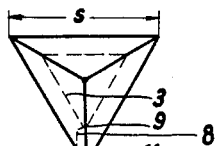
FIGURE 5 is the top view of a truncated pyramid having an equilateral, triangular bottom of the lateral length, the rounding off being omitted for the sake of clarity.
Figure 7:
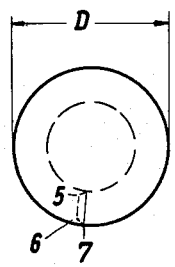
FIGURES 7 and 8 show the top view and the jacket development of a cone and a truncated cone, respectively.

In order to obtain the ultimately angular form of the side wall from a conical body, it is necessary that the linear contour of each cross-section of the truncated pyramid be equal to the linear contour of the corresponding cross-section of the truncated cone. This condition is met e.g. in the case of a triangular beaker or cup if in FIGS. 5 and 7, πD is equal to 3S. In the case of a quadratic cross-section with a lateral length of A, the condition πD=4A must be met. If the base surface of the pyramid is composed of several geometrical figures—for example if the base surface is a square having strongly rounded off corners—here again the condition must be met that the total linearly measured contour or periphery of the base—i.e. the sum of the lengths of the straight lines and of the curved lines—be equal to the linearly measured periphery of the circular surface which is the base surface of the auxiliary truncated cone, and that said linearly measured total periphery of said square rounded off at the corners, should decrease in the direction of height of the truncated pyramid in the same proportion as in the case of the auxiliary truncated cone.

Figure 6:
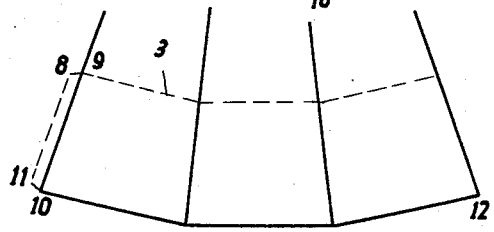
FIGURE 6 shows the development of the pyramid jacket, the dotted line 3 in FIGS. 5 and 6 cutting the pyramid to a truncated pyramid.
Figure 8:

However, thereby the following should be also taken into consideration: As shown in FIGS. 6 and 8, the base lines of the development of the jacket of the pyramid are angular (see 12—10 in FIG. 6) and in the case of the cone round (see 13—7 in FIG. 8). FIG. 9 shows (approximately to scale) the amount of this difference. If now from a pyramid jacket (according to FIG. 6) a truncated cone is wound, FIG. 11 results (which is the view in a plane through the axis of the cone or pyramid). The dotted lines 16—17, 18—19, 20—21 (in FIG. 11) are the later resulting corners of the pyramid. The limitations at the upper and lower section lines (16—18—20 and 17—19—21) become straight lines after the pressing to angular form, but they are arched in conical condition of the jacket.

In considering the trapezoid of the development 22—23—24—25 of FIG. 10, it will be noted that it can be found again in the conical jacket portion 16—17—18—19 of FIG. 11. The line 17—19 is arched upward, because in the jacket limitation the segment is missing, which is formed between the line 23—27—25 and the circular arc 23—26—25.

The reverse will occur if a conical jacket is wound to a frustrated cone and this is later pressed into a triangular mold. In this case FIG. 12 results. If the surface 28—29—30—31 is considered, it will be seen that it corresponds to jacket portion 23—26—25—24—32—22, FIG. 9, which consists of two straight (cone-forming) lines and two arcuate lines.

In order to avoid an uneven limitation in the triangular finished cup (like in FIG. 12) or to avoid that in flanging edge 2 unequal amounts of paper must be rolled away, the side wall must be formed from the development of the jacket of the truncated pyramid corresponding to the finish cup, conically according to FIG. 11. The latter takes up—as soon as it is pressed into the pyramid mold—the form of FIG. 13, in which the cone jacket portion 17—19—16—18, FIG. 11, becomes an even form, i.e. the trapezoid 33—34—35—36.

Figure 2:
Figure 1:
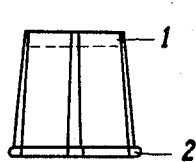
Figure 14:
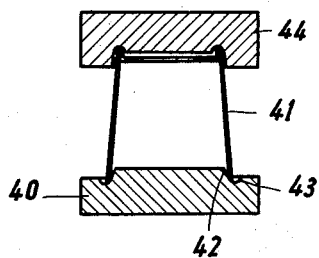
FIGURE 14 shows a lateral wall having the shape of a truncated cone, which is under the action of a bending ring at the smaller diameter and the larger diameter.

The considerably simplified manufacture of such beakers or cups can be further simplified by carrying out—or at least starting by a preliminary operation—the beading 2 (FIG. 1) when the side wall is still cone-shaped. This is done, as shown in FIG. 14, in a manner known per se, by pressing ring 40 in the direction of the arrow against lateral wall 41 (which can be prevented from buckling by an outer or inner lining if desired), whereby the outer edge is first expanded by the inclined surface 42 and then rolled by surface 43. It is clear that it is particularly difficult to prepare tools in angular form for obtaining this effect. Above all, beading of sharp corners is not possible and beading of rounded off corners is the more difficult the smaller the radius is. If, however, beading is started while the side wall is still round, the formation of beads will be formed at the curved edges of large radii, which can be easier continued even if the wall is bent over sharp curvatures. This effect is increased at the upper edge (by bead forming ring 44 in FIG. 14), because due to the conical design the diameters are smaller here.

Finally the following should be also taken here into consideration. The side wall is formed prior to the formation of beads, according to FIG. 11. Correspondingly, the upper beading formed by ring 44 will meet the edge to be bent, first at the peaks of the arcs 45, FIG. 11, and the lower beading first at the corners 17, 19 and 21. This is no particular disadvantage, because the beaded edge is not strongly curved yet. However, after beading the truncated cone obtains at the bottom and on top an even limitation (as long as the axial passes of the bead rings are even). Then, however, after the angular pressing a truncated pyramid according to FIG. 12 is formed, i.e. a body having uneven limiting surfaces. Angular beading tools also having even passes would then start beading on the beforementioned bottom part just at the sharp or rounded corners 28 and 29. In order to avoid this, it is contemplated according to the invention, to unevenly stick in the passes of the beading tools which act on the still round side wall, in such manner that beading is carried out axially farther than at other points, at those points, at which beading under these conditions is more difficult, such as the rounded corners. Thereby these points should come in working contact with the beading tools not earlier, but rather later than the points which can be treated more easily (e.g. the straight edges). Such a beading ring having a groove extending in curved form, can be obtained in relatively simple manner with the use of a copying device by turning. This device must axially extend in analogy to the conventional radially extending copying devices, known from the art of relieving or backing-off lathes for the manufacture of milling cutters.

Finally it is also suggested that manufacture of the angular tools be carried out by means of a copying device, by which they can be turned, instead of being milled. This device operates like a backing-off lathe, in which the copying pattern extends over the entire length, so that the conicity, as well as the part which does not extend in circular design, can be completely copied by a copying device which synchronously rotates with the work piece. Such a copying device has the advantage, that in the conventional arrangement of several tools on a rotary-table machine, such tools can be manufactured identically with each other with the same template.

Finishing of the mouth roll, i.e. of the bead 2 seated at the opening having the largest diameter (FIG. 1) in angular condition—irrespective of whether a preliminary beading step was, or was not, carried out—is preferably effected with heated tools, so that the paper retains this new form, to which it has been pressed after the side wall was originally round, and does not have the tendency of taking up the old form. This effect of the heated tools can be increased by hot-pressing part of the side walls too, particularly at the corners.

The term "hard paper" is used herein to denote paper which consists of the conventional cellulosic fibers and due to its thickness and consistency can be used for forming receptacles primarily for packing and transporting goods.

The term "copying device" denotes herein a machine for duplicating, of the type described, for example, in lathes.

What is claimed is:

1. A process for the manufacture of a hard paper cup or the like in the form of an inverted truncated pyramid having a non-circular cross section, said cup having a separate bottom having an upright flange of corresponding cross section fixedly secured to said side wall, said cup having at least the upper edge thereof formed with a bead; comprising first forming said side wall into an inverted truncated cone having a circular cross section, partially forming said bead on said upper edge of said cup, then forming said flange of said bottom on a mandrel of inverted pyramidal form having a noncircular cross section, then forming said side wall on said same mandrel into an inverted truncated pyramid having a corresponding noncircular cross section and arcuate end edges, then completing said bead, and then fixedly securing said flange of said bottom to said side wall.

2. A process for the manufacture of a hard paper cup or the like in the form of an inverted truncated pyramid having a non-circular cross section, said cup having a separate bottom having an upright flange of corresponding cross section fixedly secured to said side wall, said cup having at least the upper edge thereof formed with a bead; comprising first forming said side wall into an inverted truncated cone having a circular cross section, partially forming said bead so as to more nearly complete the same at those portions of said upper edge which will be more difficult to complete when the same becomes arcuate from the formation of said side wall into a truncated pyramid than those portions of said upper edge which will then be more easy to completely bead, then forming said flange of said bottom on a mandrel of inverted pyramidal form having a noncircular cross section, then forming said side wall on said same mandrel into an inverted truncated pyramid having a corresponding noncircular cross section and arcuate end edges, then completing said bead on said upper edge, and then fixedly securing said flange of said bottom to said side wall.

3. The process of claim 2, wherein completion of said bead includes the application of heat after said flange of said bottom is secured to said side wall.

4. A process as claimed in claim 3, in which at least part of the receptacle adjacent said bead is subjected to hot pressing simultaneously.

5. A process as claimed in claim 3, in which at least part of the receptacle adjacent said bead is subjected to hot pressing in a separate step.

References Cited in the file of this patent

UNITED STATES PATENTS

| | | |
|---|---|---|
| 1,305,511 | Bartlett | June 3, 1919 |
| 2,208,319 | Bickel et al. | July 16, 1940 |
| 2,802,407 | Majer | Aug. 13, 1957 |
| 2,827,837 | Meyer-Jagenberg | Mar. 25, 1958 |